United States Patent
Sikri et al.

(10) Patent No.: US 9,288,761 B2
(45) Date of Patent: Mar. 15, 2016

(54) POWER SCAN OPTIMIZATION

(71) Applicant: QUALCOMM Incorporated, San Diego, CA (US)

(72) Inventors: Divaydeep Sikri, Farnborough (GB); Mukund Agarwal, Farnborough (GB); Hassan Rafique, Farnborough (GB); Syed Hamza Rafique, Slough (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/190,923

(22) Filed: Feb. 26, 2014

(65) Prior Publication Data

US 2015/0245294 A1   Aug. 27, 2015

(51) Int. Cl.
| | |
|---|---|
| *H04M 1/00* | (2006.01) |
| *H04W 52/02* | (2009.01) |
| *H04W 52/24* | (2009.01) |
| *H04W 36/08* | (2009.01) |
| *H04W 48/20* | (2009.01) |
| *H04W 88/06* | (2009.01) |

(52) U.S. Cl.
CPC ...... *H04W 52/0238* (2013.01); *H04W 52/0245* (2013.01); *H04W 36/08* (2013.01); *H04W 48/20* (2013.01); *H04W 52/241* (2013.01); *H04W 88/06* (2013.01)

(58) Field of Classification Search
CPC ............................. H04W 4/028; H04W 24/02
USPC .................. 455/424, 437, 456.6, 434, 422.1; 370/328; 375/222; 607/60; 356/28.5, 356/337, 519
See application file for complete search history.

(56) References Cited

U.S. PATENT DOCUMENTS

| | | | |
|---|---|---|---|
| 7,697,645 B2 | 4/2010 | Jong | |
| 8,130,878 B2 | 3/2012 | Song et al. | |
| 8,538,354 B2 | 9/2013 | Xu et al. | |
| 8,559,574 B2 | 10/2013 | Shi et al. | |
| 2012/0270537 A1* | 10/2012 | Weng et al. | 455/424 |
| 2014/0148170 A1* | 5/2014 | Damji et al. | 455/437 |

FOREIGN PATENT DOCUMENTS

| | | |
|---|---|---|
| EP | 1056303 A2 | 11/2000 |
| EP | 2645782 A1 | 10/2013 |
| WO | WO-2013092333 A1 | 6/2013 |

OTHER PUBLICATIONS

International Search Report and Written Opinion—PCT/US2015/017385—ISA/EPO—May 26, 2015.
Joe V.D., "C/A Measurements in TEMS Investigation GSW", Aug. 10, 2009, pp. 1-7, XP055189098, Retrieved from the Internet: URL: http://networkquality.blogspot.nl/2009/08/ca-measurements-in-tems-investigation. html?view=classic [retrieved on May 13, 2015] figure 1 paragraph [01. 2]-paragraph [03. 2].

* cited by examiner

*Primary Examiner* — Kiet Doan
(74) *Attorney, Agent, or Firm* — Austin Rapp & Hardman

(57) ABSTRACT

Embodiments of the present invention include devices, systems and methods for optimized camping on a cell. One method can include beginning a power scan of a range of radio-frequency channel numbers as part of an acquisition. Power can be measured for a first set of radio-frequency channel numbers at a time using adjacent channel interference detection. An average power can be computed for each radio-frequency channel number once the range has been scanned a predetermined number of times. Other aspects, embodiments and features are also claimed and described.

29 Claims, 9 Drawing Sheets

POWER SCAN OPTIMIZATION

TECHNICAL FIELD

The technology discussed below relates generally to communication systems, and more specifically, to systems and methods for power scan optimization. Implementation of the technology can be used to enable efficient power consumption and reduced measurement time for power scans by a mobile station.

BACKGROUND

Wireless communication systems are widely deployed to provide various types of communication content such as voice, video, data, and so on. These systems may be multiple-access systems capable of supporting simultaneous communication of multiple wireless communication devices with one or more base stations.

Wireless communication devices are typically battery powered. As wireless communication devices become more complicated, so has the desire for wireless communication devices to maximize battery life. By reducing a wireless communication device's power use, battery life may be increased.

Users of wireless communication devices desire that their devices respond quickly to required functionality (such as phone or data calls). However, wireless communication devices must perform initial acquisition and camp-on procedures before service can be obtained and wireless communications can be established. Those procedures may need to be performed at power-on and whenever a wireless communication device leaves and returns to a service area. These procedures may require considerable amounts of time before a user can make a phone call.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

A method for wireless communication by a wireless communication device is described. The method includes beginning a power scan of a range of radio-frequency channel numbers as part of an acquisition. Power of a first set of radio-frequency channel numbers is measured at a time using adjacent channel interference detection. An average power is computed for each radio-frequency channel number once the range has been scanned a predetermined number of times.

The first set may include a first target radio-frequency channel number, a first neighbor radio-frequency channel number and a second neighbor radio-frequency channel number. The first neighbor radio-frequency channel number may be lower in frequency than the target radio-frequency channel number. The second neighbor radio-frequency channel number may be greater in frequency than the target radio-frequency channel number. Power may be measured for a second set of radio-frequency channel numbers using adjacent channel interference detection. The second set may include a second target radio-frequency channel number that is adjacent to the first target radio-frequency channel number.

The measured power of the second set may validate power measurements of the first set. The second set may include a second target radio frequency channel number, a third neighbor radio-frequency channel number and a fourth neighbor radio-frequency channel number. The third neighbor radio-frequency channel number may be adjacent to the second neighbor radio-frequency channel number. Measurements from complex bandpass filters may be used to calculate the power of neighboring radio-frequency channel numbers.

An apparatus for wireless communication is also described. The apparatus includes a processor, memory in electronic communication with the processor and instructions stored in the memory. The instructions are executable to begin a power scan of a range of radio-frequency channel numbers as part of an acquisition. The instructions are also executable to measure power of a first set of radio-frequency channel numbers at a time using adjacent channel interference detection. The instructions are further executable to compute an average power for each radio-frequency channel number once the range has been scanned a predetermined number of times.

A wireless device is described. The wireless device includes means for beginning a power scan of a range of radio-frequency channel numbers as part of an acquisition. The wireless device also includes means for measuring power of a first set of radio-frequency channel numbers at a time using adjacent channel interference detection. The wireless device further includes means for computing an average power for each radio-frequency channel number once the range has been scanned a predetermined number of times.

A computer-program product for wireless communications is also described. The computer-program product includes a non-transitory computer-readable medium having instructions thereon. The instructions include code for causing a wireless communication device to begin a power scan of a range of radio-frequency channel numbers as part of an acquisition. The instructions also include code for causing the wireless communication device to measure power of a first set of radio-frequency channel numbers at a time using adjacent channel interference detection. The instructions further include code for causing the wireless communication device to compute an average power for each radio-frequency channel number once the range has been scanned a predetermined number of times.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
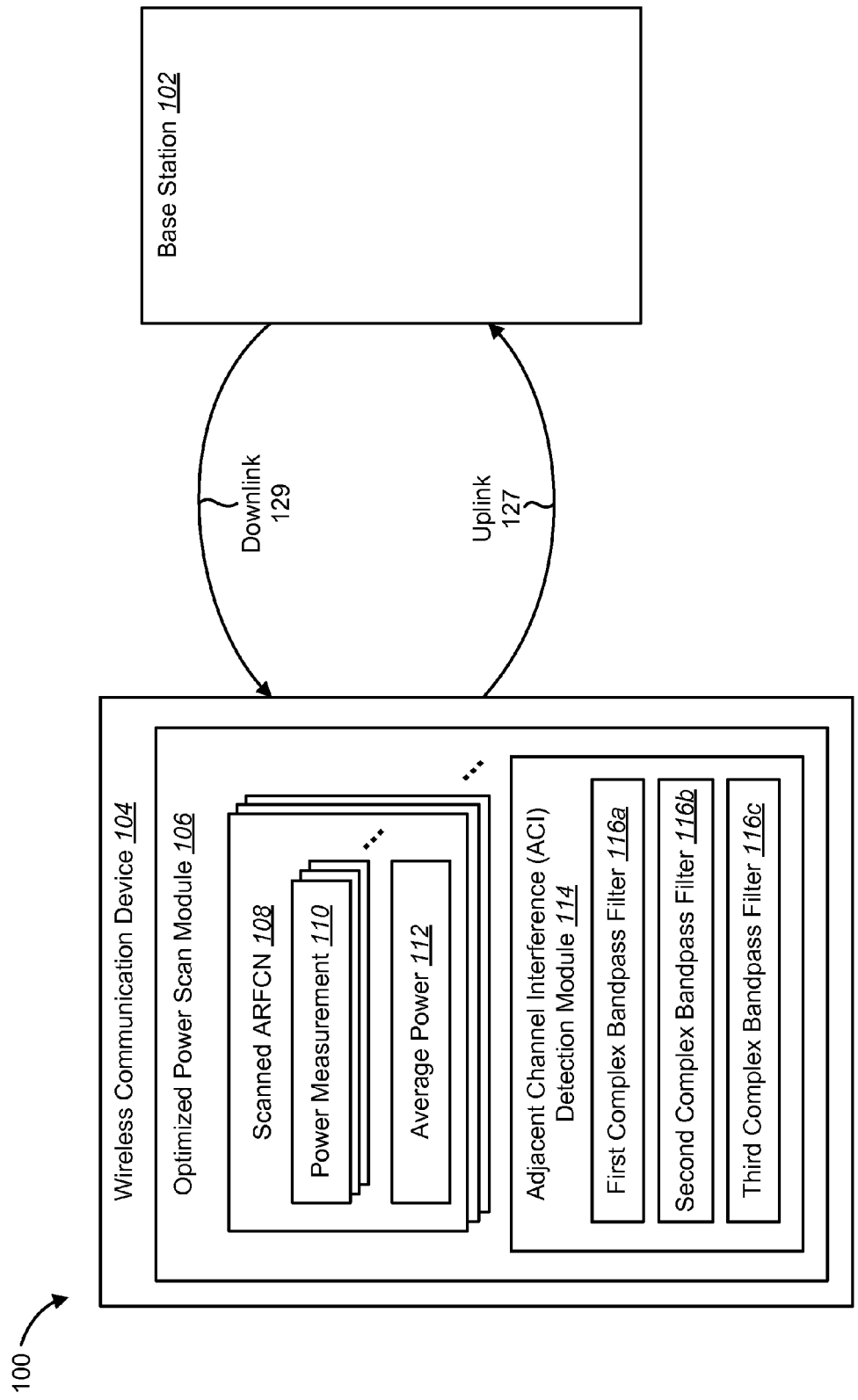
FIG. 1 shows a wireless communication system with multiple wireless devices according to some embodiments.

FIG. 1 shows a wireless communication system 100 with multiple wireless devices according to some embodiments. Wireless communication systems 100 are widely deployed to provide various types of communication content such as voice, data and so on. A wireless device may be a base station 102 or a wireless communication device 104. The wireless communication device 104 may be configured for optimized power scan. For example, the wireless communication device 104 may be configured to perform a power scan on multiple absolute radio-frequency channel numbers (ARFCNs) 108 at the same time using infinite impulse response (IIR) based adjacent channel interference (ACI) detection. Performing a power scan on multiple ARFCNs 108 at the same time may result in less time spent measuring during a power scan and less power consumed while obtaining the measurements.

A base station 102a-b is a station that communicates with one or more wireless communication devices 104. A base station 102 may also be referred to as, and may include some or all of the functionality of, an access point, a base transceiver station (BTS), a broadcast transmitter, a NodeB, an evolved NodeB, etc. The term "base station" will be used herein. Each base station 102 provides communication coverage for a particular geographic area. A base station 102 may provide communication coverage for one or more wireless communication devices 104. The term "cell" can refer to a base station 102 and/or its coverage area depending on the context in which the term is used.

Communications in a wireless communication system 100 (e.g., a multiple-access system) may be achieved through transmissions over a wireless link. Such a communication link may be established via a single-input and single-output (SISO), multiple-input and single-output (MISO) or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

The wireless communication system 100 may utilize MIMO. A MIMO system may support both time division duplex (TDD) and frequency division duplex (FDD) systems. In a TDD system, uplink and downlink transmissions are in the same frequency region so that the reciprocity principle allows the estimation of the downlink channel from the uplink channel. This enables a transmitting wireless device to extract transmit beamforming gain from communications received by the transmitting wireless device.

The wireless communication system 100 may be a multiple-access system capable of supporting communication with multiple wireless communication devices 104 by sharing the available system resources (e.g., bandwidth and transmit power). Examples of such multiple-access systems include code division multiple access (CDMA) systems, wideband code division multiple access (WCDMA) systems, time division multiple access (TDMA) systems, frequency division multiple access (FDMA) systems, orthogonal frequency division multiple access (OFDMA) systems, single-carrier frequency division multiple access (SC-FDMA) systems, $3^{rd}$ Generation Partnership Project (3GPP) Long Term Evolution (LTE) systems and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes WCDMA and Low Chip Rate (LCR) while cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA and GSM are part of Universal Mobile Telecommunication System (UMTS). Long Term Evolution (LTE) is a release of UMTS that uses E-UTRA. UTRA, E-UTRA, GSM, UMTS and Long Term Evolution (LTE) are described in documents from an organization named "3rd Generation Partnership Project" (3GPP). cdma2000 is described in documents from an organization named "3rd Generation Partnership Project 2" (3GPP2).

The $3^{rd}$ Generation Partnership Project (3GPP) is a collaboration between groups of telecommunications associations that aims to define a globally applicable $3^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices.

In 3GPP Long Term Evolution (LTE), a wireless communication device 104 may be referred to as a "user equipment" (UE). A wireless communication device 104 may also be referred to as, and may include some or all of the functionality of, a terminal, an access terminal, a subscriber unit, a station, etc. A wireless communication device 104 may be a cellular phone, a personal digital assistant (PDA), a wireless device, a wireless modem, a handheld device, a laptop computer, entertainment device, wearable device, television, computing device, and many other types of devices capable of wireless communication.

A wireless communication device 104 may communicate with zero, one or multiple base stations 102 on the downlink 129 and/or uplink 127 at any given moment. The downlink 129 (or forward link) refers to the communication link from a base station 102 to a wireless communication device 104, and the uplink 127 (or reverse link) refers to the communication link from a wireless communication device 104 to a base station 102.

The Global System for Mobile Communications (GSM) is a widespread standard in cellular, wireless communication.

GSM is relatively efficient for standard voice services. However, high-fidelity audio and data services require higher data throughput rates than that for which GSM is optimized. To increase capacity, the General Packet Radio Service (GPRS) and EDGE (Enhanced Data rates for GSM Evolution) standards have been adopted in GSM systems. In the GSM/EDGE Radio Access Network (GERAN) specification, GPRS and enhanced general packet radio service (EGPRS) provide data services. The standards for GERAN are maintained by the 3GPP (Third Generation Partnership Project). GERAN is a part of GSM. More specifically, GERAN is the radio part of GSM/EDGE together with the network that joins the base stations 102 (the Ater and Abis interfaces) and the base station controllers (A interfaces, etc.). GERAN represents the core of a GSM network. It routes phone calls and packet data from and to the PSTN (Public Switched Telephone Network) and Internet to and from remote terminals. GERAN is also a part of combined UMTS/GSM networks.

GSM employs a combination of Time Division Multiple Access (TDMA) and Frequency Division Multiple Access (FDMA) for the purpose of sharing the spectrum resource. GSM networks typically operate in a number of frequency bands. For example, a GSM network may use the GSM-850 band, the EGSM band (also referred to as the E-GSM-900 band), the DCS (digital cellular service) band (also referred to as DCS-1800), the PCS (personal communications service) band (also referred to as PCS-1900), the P-GSM band, the R-GSM band and the T-GSM band.

The wireless communication device 104 may include an optimized power scan module 106 that implements a power scan algorithm. The optimized power scan module 106 may allow the wireless communication device 104 to perform an optimized power scan. A power scan is used by a wireless communication device 104 to search each and every band/mode that the wireless communication device 104 can operate on to find the best candidate for cell selection. A power scan may be performed as part of an acquisition.

In previous implementations, a power measurement 110 for each ARFCN 108 is obtained individually during the power scan. Furthermore, a power scan is performed a specific number of times over the ARFCN 108 range (e.g., between two and ten times). The average of the multiple power measurements 110 is taken for each ARFCN 108 to determine the best candidate for cell selection. This power scan implementation requires a significant amount of time for measuring and a significant amount of power is consumed during these measurements. It may be beneficial to reduce the amount of time spent measuring ARFCNs 108 and the amount of power consumed measuring ARFCNs 108 during a power scan.

The optimized power scan module 106 (or algorithm) may include a list of scanned ARFCNs 108. Each scanned ARFCN 108 may include multiple power measurements 110 and an average power 112 that are obtained during an acquisition. Depending on the configuration of the optimized power scan module 106, a scanned ARFCN 108 may include multiple power measurements 110. In one configuration, a wireless communication device 104 may obtain twice the typical number of power measurements 110 for a scanned ARFCN 108 as part of an acquisition.

The optimized power scan module 106 may include an adjacent channel interference (ACI) detection module 114. The optimized power scan module 106 may use the adjacent channel interference (ACI) detection module 114 to measure multiple ARFCNs 108 at the same time. The adjacent channel interference (ACI) detection module 114 may include a first complex bandpass filter 116a, a second complex bandpass filter 116b and a third complex bandpass filter 116c. The adjacent channel interference (ACI) detection module 114 may also include additional complex bandpass filters (not shown). Each complex bandpass filter 116 may have a center frequency for a different ARFCN 108. For example, the first complex bandpass filter 116a may have a center frequency for a first ARFCN 108 $ARFCN_{n-1}$, the second complex bandpass filter 116b may have a center frequency for a second ARFCN 108 $ARFCN_n$ and the third complex bandpass filter 116c may have a center frequency for a third ARFCN 108 $ARFCN_{n+1}$. The total bandwidth for all three complex bandpass filters 116 may be 80 kilohertz (kHz). The measurements from the complex bandpass filters 116 may be used to obtain the power measurements 110 for neighboring ARFCNs 108 to the target ARFCN 108.

Figure 2:
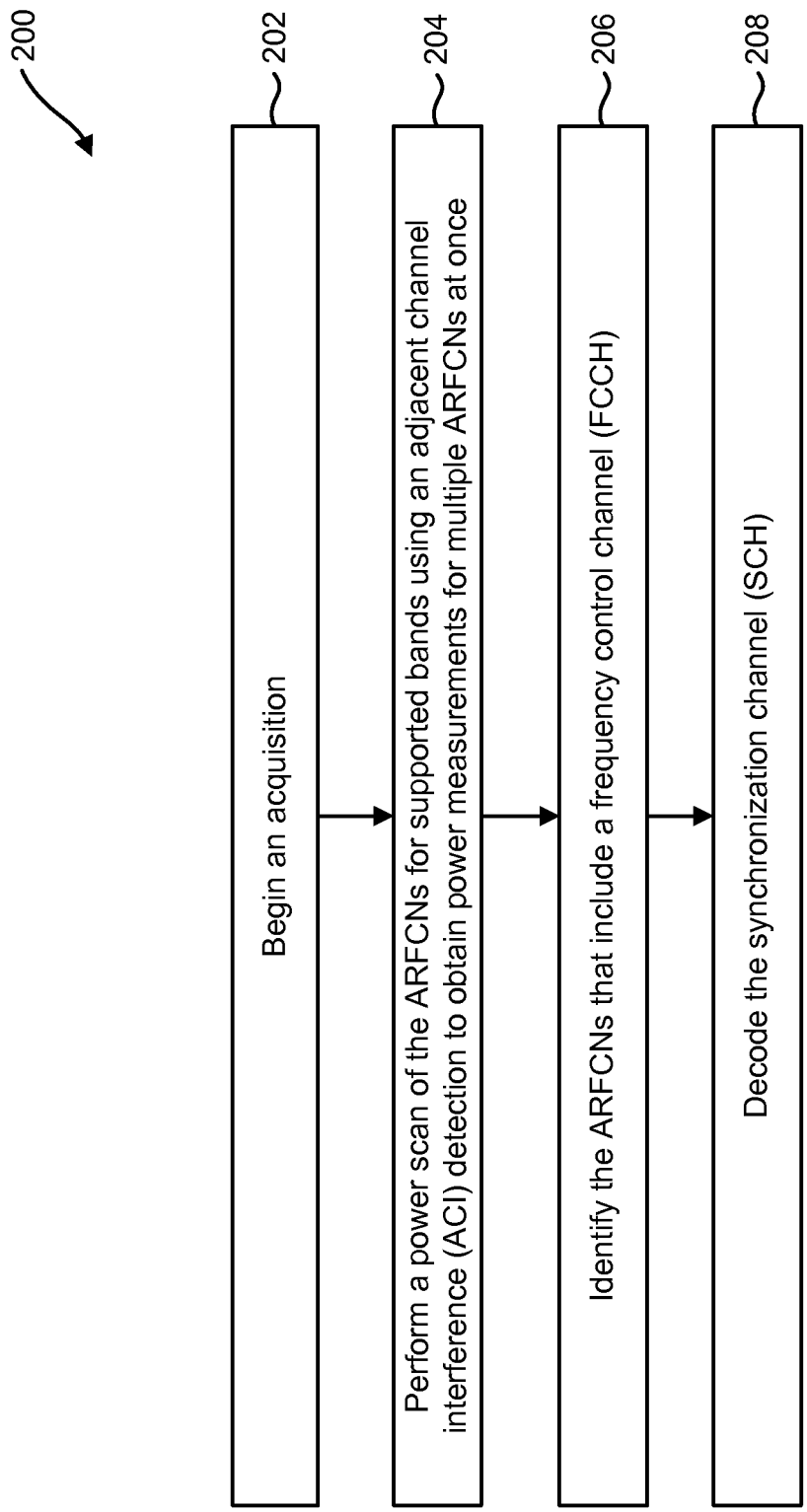
FIG. 2 is a flow diagram of a method for enhanced GSM cell acquisition according to some embodiments.

FIG. 2 is a flow diagram of a method 200 for enhanced GSM cell acquisition according to some embodiments. The method 200 may be performed by a wireless communication device 104. In one configuration, the wireless communication device 104 may be configured according to GSM standards. The wireless communication device 104 may be a multi-mode device capable of communicating using multiple bands and/or multiple radio access technologies (RATs). The wireless communication device may include an optimized power scan module 106 that can use adjacent channel interference (ACI) detection as part of a power scan.

The wireless communication device 104 may begin 202 an acquisition. In one configuration, the wireless communication device 104 may begin 202 acquiring a serving cell using at least one of an antenna, a processor and memory. The wireless communication device 104 may perform 204 a power scan of the ARFCNs 108 for supported bands using adjacent channel interference (ACI) detection to obtain power measurements 110 for multiple ARFCNs 108 at once. In one configuration, the power scan of the ARFCNs 108 may obtain power measurements 110 for three ARFCNs 108 at once. As discussed above, the wireless communication device 104 may use multiple complex bandpass filters 116 to perform 204 the scan. The scan may be performed 204 across multiple bands and/or multiple radio access technologies (RATs).

The wireless communication device 104 may identify 206 the ARFCNs 108 of the scan that include a frequency control channel (FCCH). Most ARFCNs 108 will be traffic channels. However, some of the ARFCNs 108 may be a broadcast control channel (BCCH). The BCCH data may include the cell ID, the location area code (LAC), the mobile network code (MNC) and the mobile country code (MCC). If the ARFCN 108 is a BCCH, the ARFCN 108 may include a 67 kHz tone (which is the FCCH) that is repeated approximately every 50 ms. Once the FCCH is found, the next frame (4.6 ms later) will be the synchronization channel (SCH). The synchronization channel (SCH) may include information corresponding to a public land mobile network (PLMN) search and registration necessary for the wireless communication device 104 to start a call or camp on a serving cell. The wireless communication device 104 may then decode 208 the synchronization channel (SCH). In one configuration, the wireless communication device 104 may use data corresponding to the one or more identified FCCHs to decode 208 the synchronization channel (SCH) (i.e., because the synchronization channel (SCH) immediately follows an FCCH). The wireless communication device 104 may decode 208 the synchronization channel (SCH) using at least one of an antenna, a processor and memory. The wireless communication device 104 may use the decoded synchronization channel (SCH) to acquire a serving cell.

Figure 3:
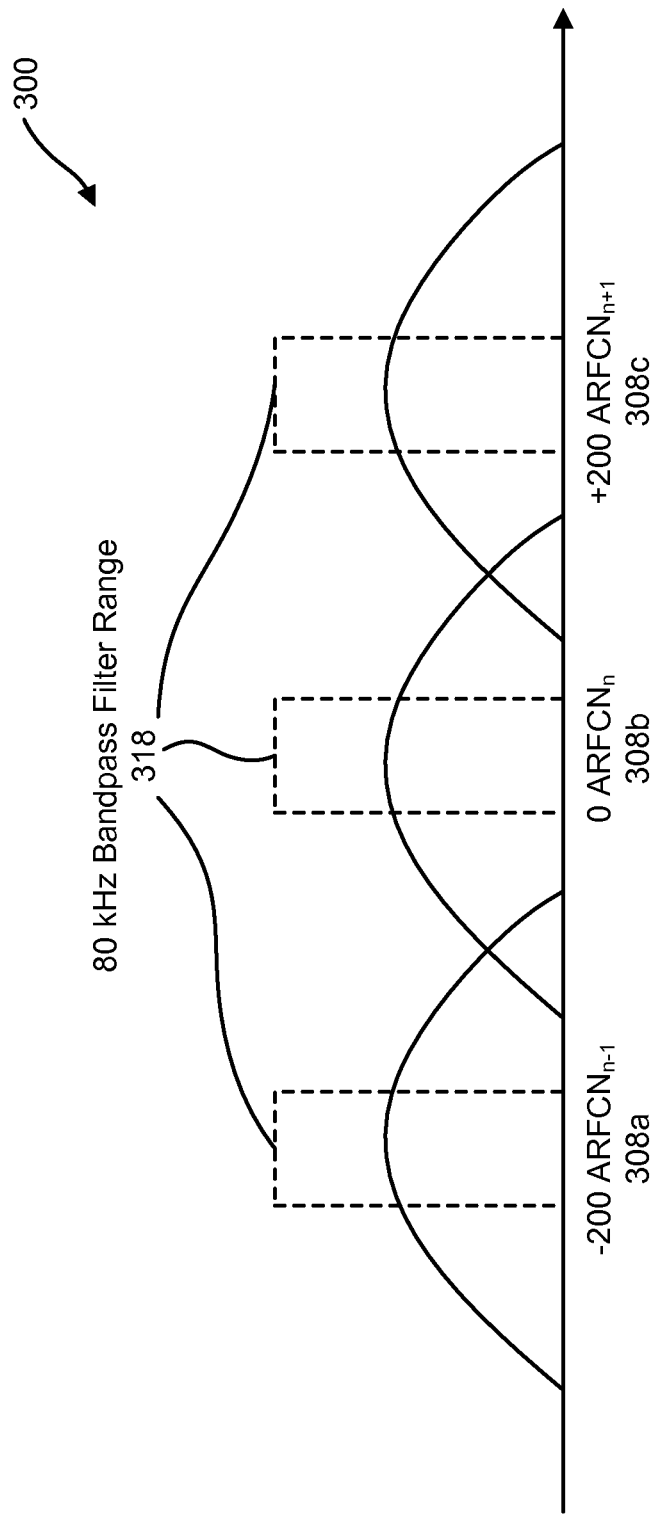
FIG. 3 illustrates adjacent channel interference (ACI) detection.

FIG. 3 illustrates adjacent channel interference (ACI) detection 300. The adjacent channel interference (ACI) detection 300 may be used in a power scan as part of an acquisition. The bands for three ARFCNs 108 (ARFCN$_{n-1}$ 308a, ARFCN$_n$ 308b and ARFCN$_{n+1}$ 308c) are illustrated. A complex bandpass filter 116 is used for each ARFCN 308. The center frequency of each complex bandpass filter 116 corresponds to the center frequency of the specific ARFCN 308. Thus, in this configuration, the first complex bandpass filter 116a is centered at the frequency of ARFCN$_{n-1}$ 308a, the second complex bandpass filter 116b is centered at the frequency of ARFCN$_n$ 308b and the third complex bandpass filter 116c is centered at the frequency of ARFCN$_{n+1}$ 308c. The three complex bandpass filters 116 may thus cover an 80 kHz bandpass filter range 318.

In one configuration, the middle ARFCN 308b of an ARFCN set may be referred to as the target ARFCN 308 and the two outer ARFCNs 308a,c may be referred to as neighbor ARFCNs 308. Thus, in the example illustrated, ARFCN$_n$ 308b is the target ARFCN 308 while ARFCN$_{n-1}$ 308a and ARFCN$_{n+1}$ 308c are neighbor ARFCNs 308.

The measurements from the complex bandpass filters 116 may be used to calculate the power of neighboring ARFCNs 308. Thus, one measurement using infinite impulse response (IIR) based adjacent channel interference (ACI) detection 300 may result in three power measurements 110 for three ARFCNs 308, one power measurement 110 for each of the ARFCNs 308. In one configuration, part of measuring using adjacent channel interference (ACI) detection 300 may include checking for leakage from the neighbor ARFCNs 308a,c in the complex bandpass filters 116 around the target ARFCN 308b. From the leakage characteristics, the power level of neighboring ARFCNs 308 can be deduced.

Figure 4:
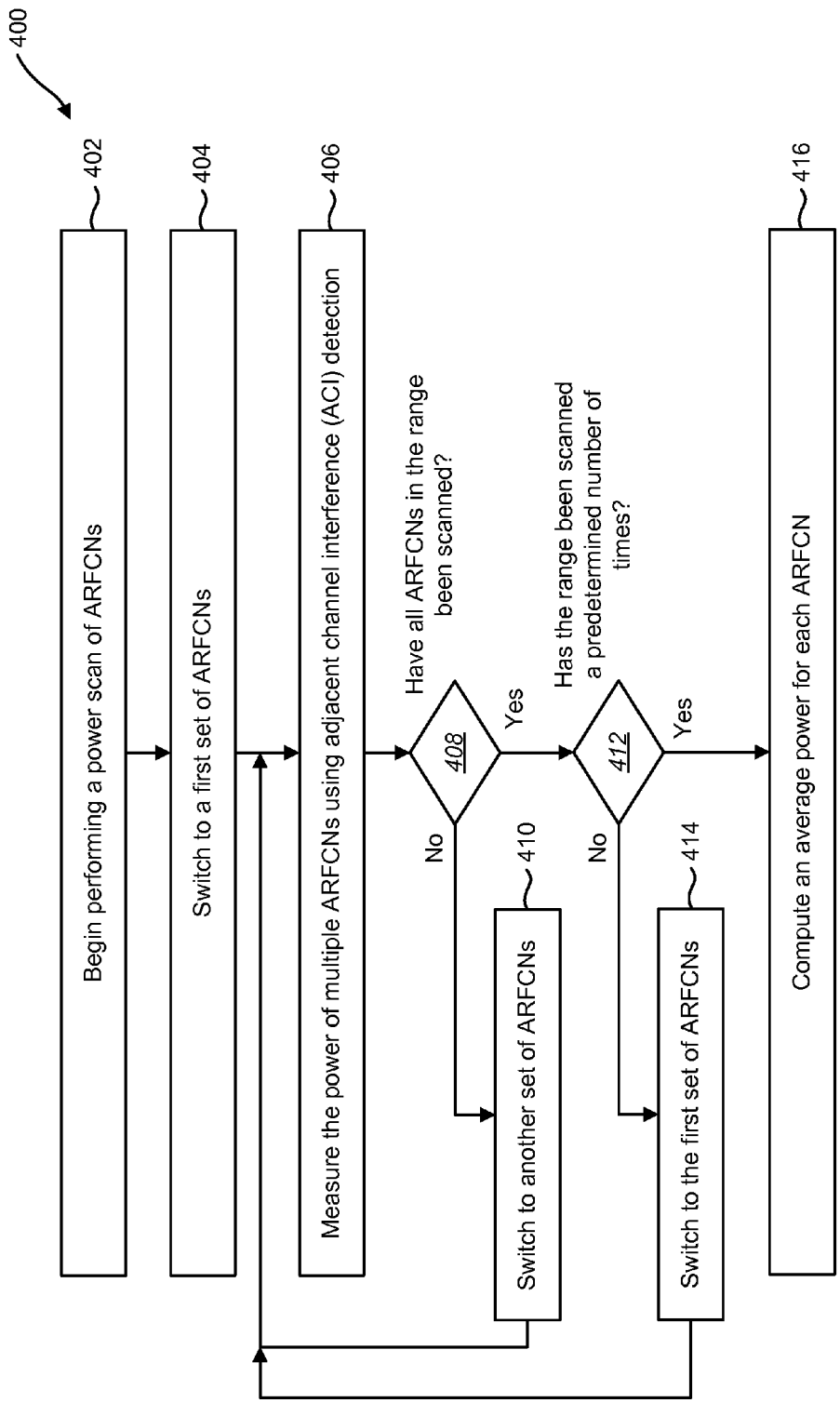
FIG. 4 is a flow diagram of a method for performing a power scan of the ARFCNs for supported bands using adjacent channel interference (ACI) detection to obtain power measurements for multiple ARFCNs at once.

FIG. 4 is a flow diagram of a method 400 for performing a power scan of the ARFCNs 108 for supported bands using adjacent channel interference (ACI) detection 300 to obtain power measurements 110 for multiple ARFCNs 108 at once. The method 400 of FIG. 4 may be one configuration of performing 204 a power scan of the ARFCNs 108 for supported bands using adjacent channel interference (ACI) detection 300 to obtain power measurements 110 for multiple ARFCNs 108 at once described above in relation to FIG. 2. The method 400 may be performed by a wireless communication device 104. The wireless communication device 104 may be configured for adjacent channel interference (ACI) detection 300. For example, the wireless communication device 104 may include multiple complex bandpass filters 116.

The wireless communication device 104 may begin 402 performing a power scan of ARFCNs 108. The wireless communication device 104 may switch 404 to a first set of ARFCNs 108. A set of ARFCNs 108 may include three ARFCNs 108 that neighbor each other (i.e., that occupy three consecutive portions of a frequency band). The wireless communication device 104 may measure 406 the power 110 at the multiple ARFCNs 108 using adjacent channel interference (ACI) detection 300. The wireless communication device 104 may determine 408 whether all the ARFCNs 108 in the range have been scanned. The range may refer to the range of possible ARFCNs 108 that the wireless communication device 104 can obtain service on. The range is discussed below in relation to FIG. 5 and FIG. 6.

If all the ARFCNs 108 in the range have not been scanned, the wireless communication device 104 may switch 410 to another set of ARFCNs 108. In one configuration, the wireless communication device 104 may switch 410 to another set of ARFCNs 108 that includes some of the first set of ARFCNs 108. For example, the wireless communication device 104 may switch 410 from scanning a first ARFCN 108 (ARFCN$_{n-1}$), a second ARFCN 108 (ARFCN$_n$) and a third ARFCN 108 (ARFCN$_{n+1}$) to scanning the second ARFCN 108 (ARFCN$_n$), the third ARFCN 108 (ARFCN$_{n+1}$) and a fourth ARFCN 108 (ARFCN$_{n+2}$). This is described in additional detail below in relation to FIG. 5.

In another configuration, the wireless communication device 104 may switch 410 to another set of ARFCNs 108 that does not include any of the first set of ARFCNs 108. For example, the wireless communication device 104 may switch 410 from scanning the first ARFCN 108 (ARFCN$_{n-1}$), the second ARFCN 108 (ARFCN$_n$) and the third ARFCN 108 (ARFCN$_{n+1}$) to scanning the fourth ARFCN 108 (ARFCN$_{n+2}$), a fifth ARFCN 108 (ARFCN$_{n+3}$) and a sixth ARFCN 108 (ARFCN$_{n+4}$). This is described in additional detail below in relation to FIG. 6. After switching 410 to another set of ARFCNs 108, the wireless communication device 104 may measure 406 the power 110 at the multiple ARFCNs 108 using adjacent channel interference (ACI) detection 300.

If all the ARFCNs 108 in the range have been scanned, the wireless communication device 104 may determine 412 whether the range has been scanned a predetermined number of times. As part of a power scan, the entire range is scanned a predetermined number of times (e.g., three) to ensure that the best candidate ARFCN 108 is selected. If the range has not been scanned the predetermined number of times times, the wireless communication device 104 may switch 414 to the first set of ARFCNs 108 and again measure 406 the power 110 at the multiple ARFCNs 108 using adjacent channel interference (ACI) detection 300. If the range has been scanned the predetermined number of times, the wireless communication device 104 may compute 416 an average power 112 for each ARFCN 108.

Figure 5:
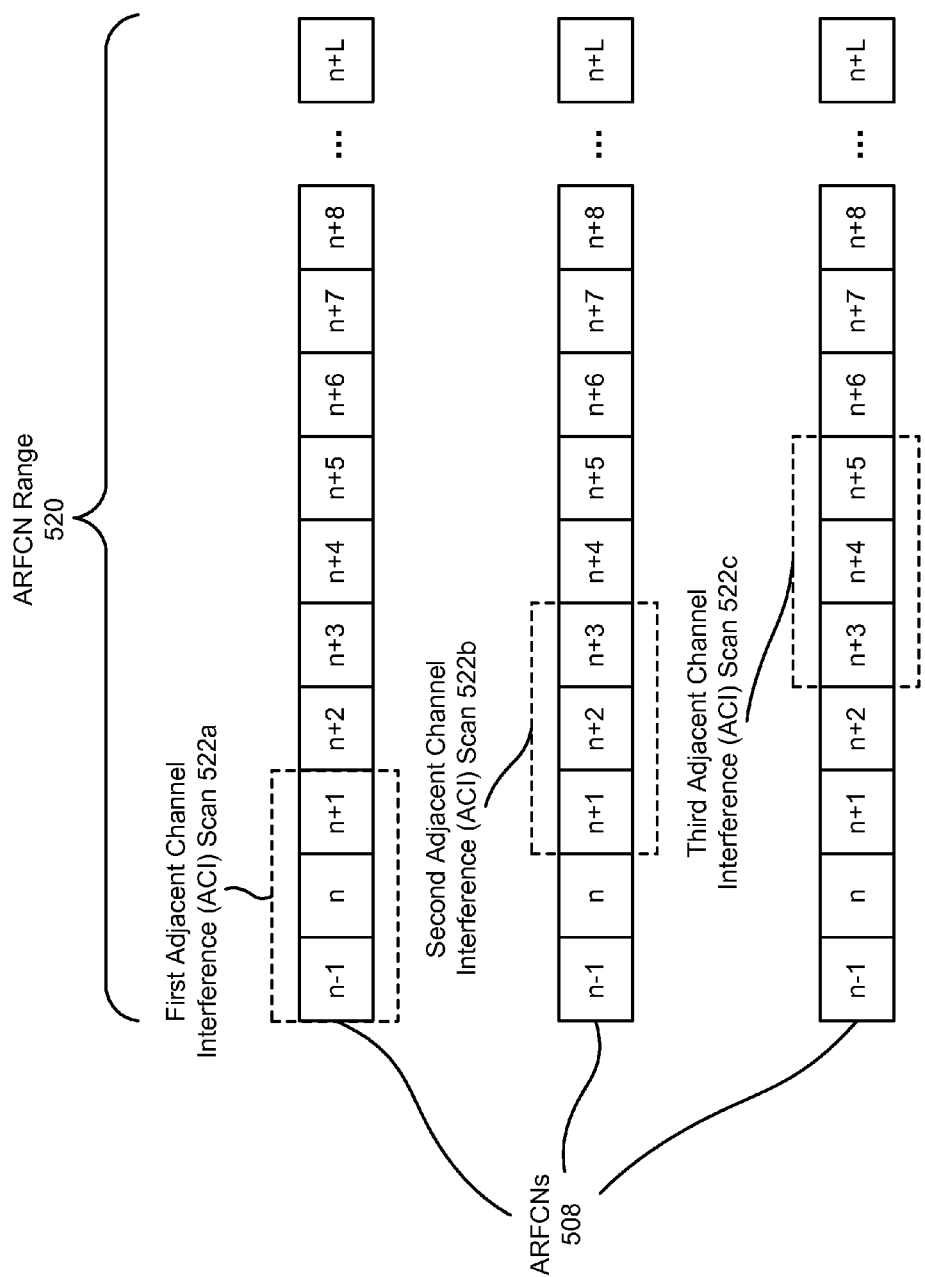
FIG. 5 is a block diagram illustrating one configuration of power scan optimization.

FIG. 5 is a block diagram illustrating one configuration of power scan optimization. A range 520 of ARFCNs 508 is shown. In the power scan optimization of FIG. 5, no ARFCNs 508 are skipped between each adjacent channel interference (ACI) scan 522a-c. By not skipping any ARFCNs 508 between each adjacent channel interference (ACI) scan 522, the measurement of an adjacent channel interference (ACI) scan 522 can be validated (e.g., compared to a second measurement to determine accuracy) by the next adjacent channel interference (ACI) scan 522. Thus, in the first adjacent channel interference (ACI) scan 522a, ARFCN$_{n-1}$ 508, ARFCN. 508 and ARFCN$_{n+1}$ 508 are scanned. In the second adjacent channel interference (ACI) scan 522b, ARFCN$_{n+1}$ 508 ARFCN$_{n+2}$ 508 and ARFCN$_{n+3}$ 508 are scanned. In the third adjacent channel interference (ACI) scan 522c, ARFCN$_{n+3}$ 508, ARFCN$_{n+4}$ 508 and ARFCN$_{n+5}$ 508 are scanned. The first adjacent channel interference (ACI) scan 522a, second adjacent channel interference (ACI) scan 522b and third adjacent channel interference (ACI) scan 522c are all part of a single power scan of the ARFCN range 520. Thus, during the power scan optimization, the range 520 may be scanned multiple times and multiple power measurements 110 may be obtained for some of the ARFCNs 508 (e.g., by deducing the power measurements 110 via the power scan algorithm described herein).

Figure 6:
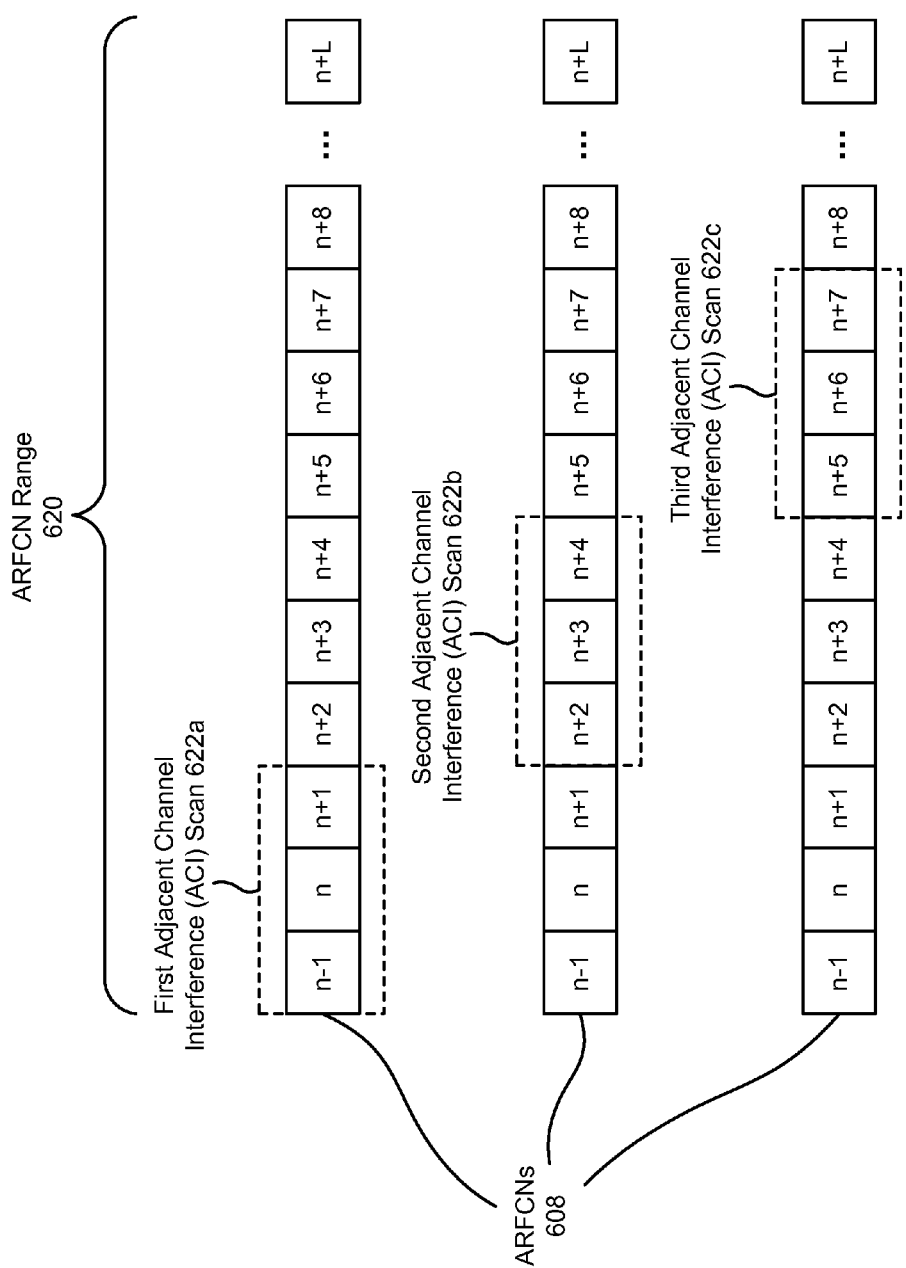
FIG. 6 is a block diagram illustrating another configuration of power scan optimization.

FIG. 6 is a block diagram illustrating another configuration of power scan optimization. A range 620 of ARFCNs 608 is shown. In the power scan optimization of FIG. 6, two ARFCNs 608 are skipped between each adjacent channel interference (ACI) scan 622a-c. Thus, in the first adjacent channel interference (ACI) scan 622a, ARFCN$_{n-1}$ 608, ARFCN. 608 and ARFCN$_{n+1}$ 608 are scanned. In the second adjacent channel interference (ACI) scan 622b, ARFCN$_{n+2}$ 608, ARFCN$_{n+3}$ 608 and ARFCN$_{n+4}$ 608 are scanned. In the third adjacent channel interference (ACI) scan 622c, ARFCN$_{n+5}$ 608, ARFCN$_{n+6}$ 608 and ARFCN$_{n+7}$ 608 are scanned. The first adjacent channel interference (ACI) scan 622a, second adjacent channel interference (ACI) scan 622b and third adjacent channel interference (ACI) scan 622c are all part of a single power scan of the range 620. Thus, during the power scan optimization, the range 620 may be scanned multiple times, with each scan resulting in a single power measurement 110 being obtained for each of the ARFCNs 608.

Figure 7:
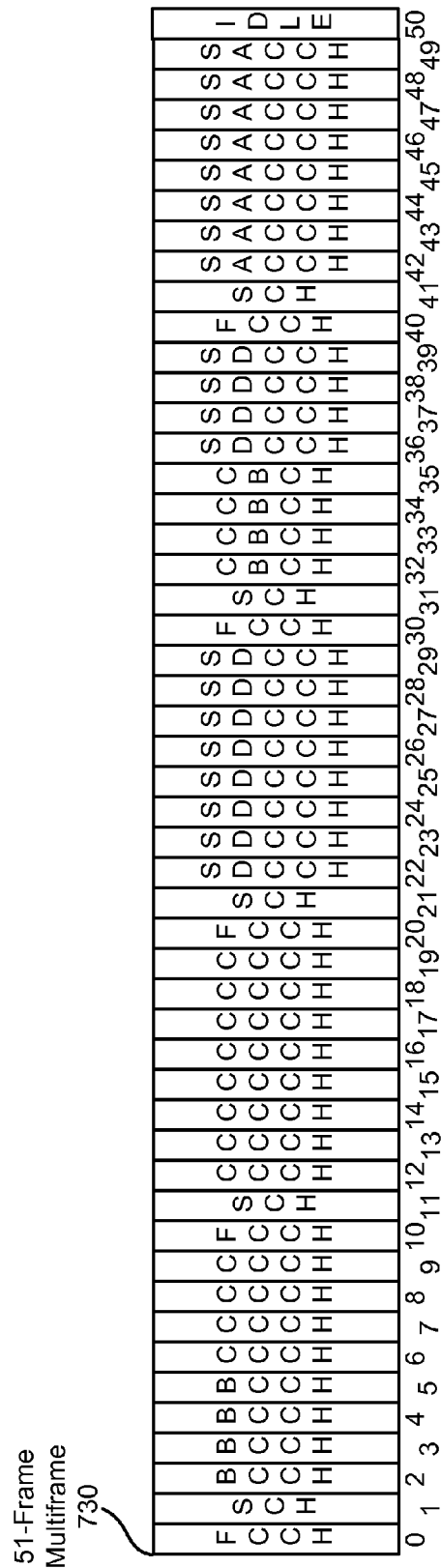
FIG. 7 is a block diagram illustrating a 51-frame multiframe for use in the present systems and methods.

FIG. 7 is a block diagram illustrating a 51-frame multiframe 730 for use in the present systems and methods. Different channels may be mapped to different frames within the 51-frame multiframe 730. For example, the broadcast control channel (BCCH) may be mapped to frames 2 through 5. The mapping of the channels to specific frames may be fixed by the specification.

Figure 8:
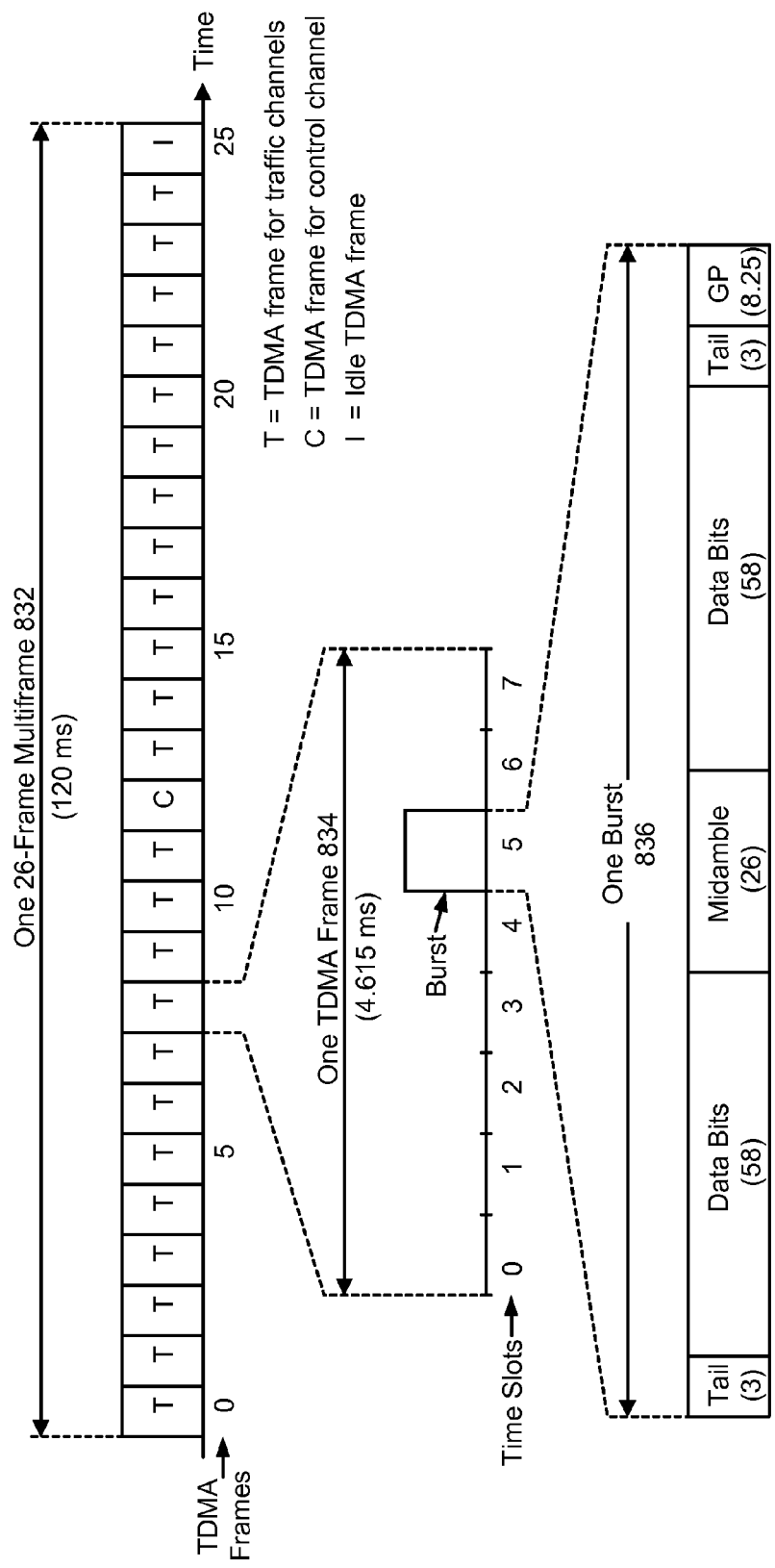
FIG. 8 shows example frame and burst formats in GSM.

FIG. 8 shows example frame and burst formats in GSM. The timeline for transmission is divided into multiframes 832. For traffic channels used to transmit user-specific data, each multiframe 832 in this example includes 26 TDMA frames 834, which are labeled as TDMA frames 0 through 25. The traffic channels, in this example, are sent in TDMA frames 0 through 11 and TDMA frames 13 through 24 of each multiframe 832 (other mappings are possible using half-rate channels or Voice services over Adaptive Multi-user channels on One Slot (VAMOS)). A control channel is sent in TDMA frame 12. No data is sent in idle TDMA frame 25, which is used by the wireless communication devices 104 to make measurements of signals transmitted by neighbor base stations 102.

Each time slot within a frame is also referred to as a "burst" 836 in GSM. Each burst 836, in this example, includes two tail fields, two data fields, a training sequence (or midamble) field and a guard period (GP). The number of symbols in each field is shown inside the parentheses. A burst 836 includes symbols for the tail, data, and midamble fields. No symbols are sent in the guard period. TDMA frames of a particular carrier frequency are numbered and formed in groups of 26 or 51 TDMA frames 834 called multiframes 832.

Figure 9:
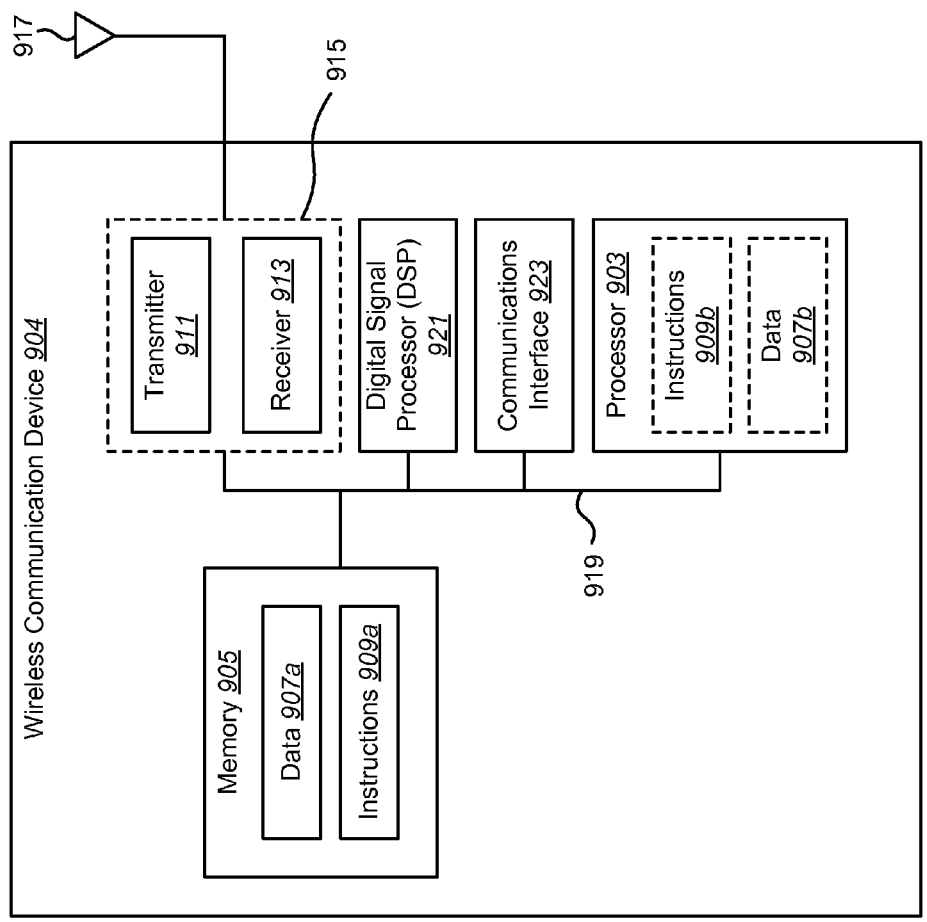
FIG. 9 illustrates certain components that may be included within a wireless communication device according to some embodiments.

FIG. 9 illustrates certain components that may be included within a wireless communication device 904 according to some embodiments. The wireless communication device 904 of FIG. 9 may be one configuration of the wireless communication device 104 of FIG. 1. The wireless communication device 904 may be an access terminal, a mobile station, a user equipment (UE), etc. The wireless communication device 904 includes a processor 903. The processor 903 may be a general purpose single- or multi-chip microprocessor (e.g., an ARM), a special purpose microprocessor (e.g., a digital signal processor (DSP)), a microcontroller, a programmable gate array, etc. The processor 903 may be referred to as a central processing unit (CPU). Although just a single processor 903 is shown in the wireless communication device 904 of FIG. 9, in an alternative configuration, a combination of processors (e.g., an ARM and DSP) could be used.

The wireless communication device 904 also includes memory 905. The memory 905 may be any electronic component capable of storing electronic information. The memory 905 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 907a and instructions 909a may be stored in the memory 905. The instructions 909a may be executable by the processor 903 to implement the methods disclosed herein. Executing the instructions 909a may involve the use of the data 907a that is stored in the memory 905. When the processor 903 executes the instructions 909, various portions of the instructions 909b may be loaded onto the processor 903, and various pieces of data 907b may be loaded onto the processor 903. In one configuration, the processor 903 may include the optimized power scan module 106 discussed above.

The wireless communication device 904 may also include a transmitter 911 and a receiver 913 to allow transmission and reception of signals to and from the wireless communication device 904 via an antenna 917. The transmitter 911 and receiver 913 may be collectively referred to as a transceiver 915. The wireless communication device 904 may also include (not shown) multiple transmitters, multiple antennas, multiple receivers and/or multiple transceivers.

The wireless communication device 904 may include a digital signal processor (DSP) 921. The wireless communication device 904 may also include a communications interface 923. The communications interface 923 may allow a user to interact with the wireless communication device 904.

The various components of the wireless communication device 904 may be coupled together by one or more buses, which may include a power bus, a control signal bus, a status signal bus, a data bus, etc. For the sake of clarity, the various buses are illustrated in FIG. 9 as a bus system 919.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 2 and 4, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized. For example, some of the methods described herein may be performed by a processor 903, software and/or firmware.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for wireless communication by a wireless communication device, comprising:
    beginning a power scan of a range of radio-frequency channel numbers as part of an acquisition;
    measuring power of a first set of radio-frequency channel numbers at a time using adjacent channel interference detection, wherein no absolute radio-frequency channel numbers are skipped between each adjacent channel interference scan; and computing an average power for each radio-frequency channel number once the range has been scanned a predetermined number of times;
    wherein measurements from complex bandpass filters are used to calculate the power of neighboring radio-frequency channel numbers.

2. The method of claim 1, wherein the first set comprises a first target radio-frequency channel number, a first neighbor radio-frequency channel number and a second neighbor radio-frequency channel number.

3. The method of claim 2, wherein the first neighbor radio-frequency channel number is lower in frequency than the target radio-frequency channel number, and wherein the second neighbor radio-frequency channel number is greater in frequency than the target radio-frequency channel number.

4. The method of claim 1, further comprising measuring power of a second set of radio-frequency channel numbers using adjacent channel interference detection.

5. The method of claim 4, wherein the second set comprises a second target radio-frequency channel number, and wherein the second target radio-frequency channel number is adjacent to the first target radio-frequency channel number.

6. The method of claim 5, wherein the measured power of the second set validates power measurements of the first set.

7. The method of claim 4, wherein the second set comprises a second target radio frequency channel number, a third neighbor radio-frequency channel number and a fourth neighbor radio-frequency channel number, wherein the third neighbor radio-frequency channel number is adjacent to the second neighbor radio-frequency channel number.

8. The method of claim 1, wherein the determining comprises checking for leakage from neighbor radio-frequency channel numbers in complex bandpass filters around a target radio-frequency channel number.

9. An apparatus for wireless communication, comprising:
a processor;
memory in electronic communication with the processor; and
instructions stored in the memory, the instructions being executable by the processor to:
begin a power scan of a range of radio-frequency channel numbers as part of an acquisition;
measure power of a first set of radio-frequency channel numbers at a time using adjacent channel interference detection, wherein no absolute radio-frequency channel numbers are skipped between each adjacent channel interference scan; and
compute an average power for each radio-frequency channel number once the range has been scanned a predetermined number of times;
wherein measurements from complex bandpass filters are used to calculate the power of neighboring radio-frequency channel numbers.

10. The apparatus of claim 9, wherein the first set comprises a first target radio-frequency channel number, a first neighbor radio-frequency channel number and a second neighbor radio-frequency channel number.

11. The apparatus of claim 10, wherein the first neighbor radio-frequency channel number is lower in frequency than the target radio-frequency channel number, and wherein the second neighbor radio-frequency channel number is greater in frequency than the target radio-frequency channel number.

12. The apparatus of claim 9, wherein the instructions are further executable to measure power of a second set of radio-frequency channel numbers using adjacent channel interference detection.

13. The apparatus of claim 12, wherein the second set comprises a second target radio-frequency channel number, and wherein the second target radio-frequency channel number is adjacent to the first target radio-frequency channel number.

14. The apparatus of claim 13, wherein the measured power of the second set validates power measurements of the first set.

15. The apparatus of claim 12, wherein the second set comprises a second target radio frequency channel number, a third neighbor radio-frequency channel number and a fourth neighbor radio-frequency channel number, wherein the third neighbor radio-frequency channel number is adjacent to the second neighbor radio-frequency channel number.

16. A wireless device, comprising:
means for beginning a power scan of a range of radio-frequency channel numbers as part of an acquisition;
means for measuring power of a first set of radio-frequency channel numbers at a time using adjacent channel interference detection, wherein no absolute radio-frequency channel numbers are skipped between each adjacent channel interference scan; and
means for computing an average power for each radio-frequency channel number once the range has been scanned a predetermined number of times;
means for measurements from complex bandpass filters are used to calculate the power of neighboring radio-frequency channel numbers.

17. The wireless device of claim 16, wherein the first set comprises a first target radio-frequency channel number, a first neighbor radio-frequency channel number and a second neighbor radio-frequency channel number.

18. The wireless device of claim 17, wherein the first neighbor radio-frequency channel number is lower in frequency than the target radio-frequency channel number, and wherein the second neighbor radio-frequency channel number is greater in frequency than the target radio-frequency channel number.

19. The wireless device of claim 16, further comprising means for measuring power of a second set of radio-frequency channel numbers using adjacent channel interference detection.

20. The wireless device of claim 19, wherein the second set comprises a second target radio-frequency channel number, and wherein the second target radio-frequency channel number is adjacent to the first target radio-frequency channel number.

21. The wireless device of claim 20, wherein the measured power of the second set validates power measurements of the first set.

22. The wireless device of claim 19, wherein the second set comprises a second target radio frequency channel number, a third neighbor radio-frequency channel number and a fourth neighbor radio-frequency channel number, wherein the third neighbor radio-frequency channel number is adjacent to the second neighbor radio-frequency channel number.

23. A computer-program product for wireless communications, the computer-program product comprising a non-transitory computer-readable medium having instructions thereon, the instructions comprising:
code for causing a wireless communication device to begin a power scan of a range of radio-frequency channel numbers as part of an acquisition;
code for causing the wireless communication device to measure power of a first set of radio-frequency channel numbers at a time using adjacent channel interference detection, wherein no absolute radio-frequency channel numbers are skipped between each adjacent channel interference scan; and
code for causing the wireless communication device to compute an average power for each radio-frequency channel number once the range has been scanned a predetermined number of times;
code for measurements from complex bandpass filters are used to calculate the power of neighboring radio-frequency channel numbers.

24. The computer-program product of claim 23, wherein the first set comprises a first target radio-frequency channel number, a first neighbor radio-frequency channel number and a second neighbor radio-frequency channel number.

25. The computer-program product of claim 24, wherein the first neighbor radio-frequency channel number is lower in frequency than the target radio-frequency channel number, and wherein the second neighbor radio-frequency channel number is greater in frequency than the target radio-frequency channel number.

26. The computer-program product of claim 23, further comprising means for measuring power of a second set of radio-frequency channel numbers using adjacent channel interference detection.

27. The computer-program product of claim 26, wherein the second set comprises a second target radio-frequency channel number, and wherein the second target radio-frequency channel number is adjacent to the first target radio-frequency channel number.

28. The computer-program product of claim 27, wherein the measured power of the second set validates power measurements of the first set.

29. The computer-program product of claim 26, wherein the second set comprises a second target radio frequency channel number, a third neighbor radio-frequency channel number and a fourth neighbor radio-frequency channel number, wherein the third neighbor radio-frequency channel number is adjacent to the second neighbor radio-frequency channel number.

* * * * *